United States Patent [19]

Faust

[11] 4,031,714
[45] June 28, 1977

[54] FLEXIBLE COUPLING AND TORQUE-TRANSMITTING MEMBER THEREFOR

[75] Inventor: Werner Faust, Unna-Billmerich, Germany

[73] Assignee: Maschinenfabrik Stromag GmbH, Unna, Germany

[22] Filed: Feb. 24, 1976

[21] Appl. No.: 661,451

[30] Foreign Application Priority Data

Mar. 8, 1975 Germany ............................ 2510197
Apr. 14, 1975 Germany ............................ 2516238

[52] U.S. Cl. .................................. 64/12; 64/11 R; 64/19; 74/581
[51] Int. Cl.² .......................................... F16D 3/58
[58] Field of Search ............... 64/11 R, 27 NM, 14, 64/19, 12; 74/579, 581

[56] References Cited

UNITED STATES PATENTS

| | | | |
|---|---|---|---|
| 1,759,356 | 5/1930 | Kattwinkel | 64/12 |
| 2,073,852 | 3/1937 | Radford | 64/12 |
| 3,362,252 | 1/1968 | Ditlinger | 64/12 |

FOREIGN PATENTS OR APPLICATIONS

| | | | |
|---|---|---|---|
| 814,364 | 9/1951 | Germany | 64/12 |
| 303,013 | 11/1954 | Switzerland | 64/12 |

Primary Examiner—Samuel Scott
Assistant Examiner—Randall Heald
Attorney, Agent, or Firm—Erwin Salzer

[57] ABSTRACT

A flexible coupling includes a plurality of flexible torque-transmitting members arranged in a circular pattern around the axis of the coupling. Each member is of an elastomeric material and has two parallel stud-receiving passageways. The studs projecting through the radially outer passageways of the torque-transmitting members are supported on their axially outer ends by one part of the coupling. The studs projecting through the radially inner passageways are supported at their axially outer ends by the other part of the coupling. Thus torques are transmitted from one part of the coupling by way of the radially outer studs, the torque-transmitting members, and the radially inner studs, to the other part of the coupling, or vice versa. The torque-transmitting members have a number of features tending to increase the life of the coupling and to preclude relative movements, in particular pivotal movements, of the supporting studs of the torque-transmitting members relative to the torque-transmitting members proper. Each of the torque-transmitting members includes a woven reinforcement strip of which one end is arranged immediately adjacent to one of the stud-receiving passageways of the particular torque-transmitting member. Said strip forms a plurality of substantially spirally shaped windings extending around said pair of stud-receiving passageways.

22 Claims, 8 Drawing Figures

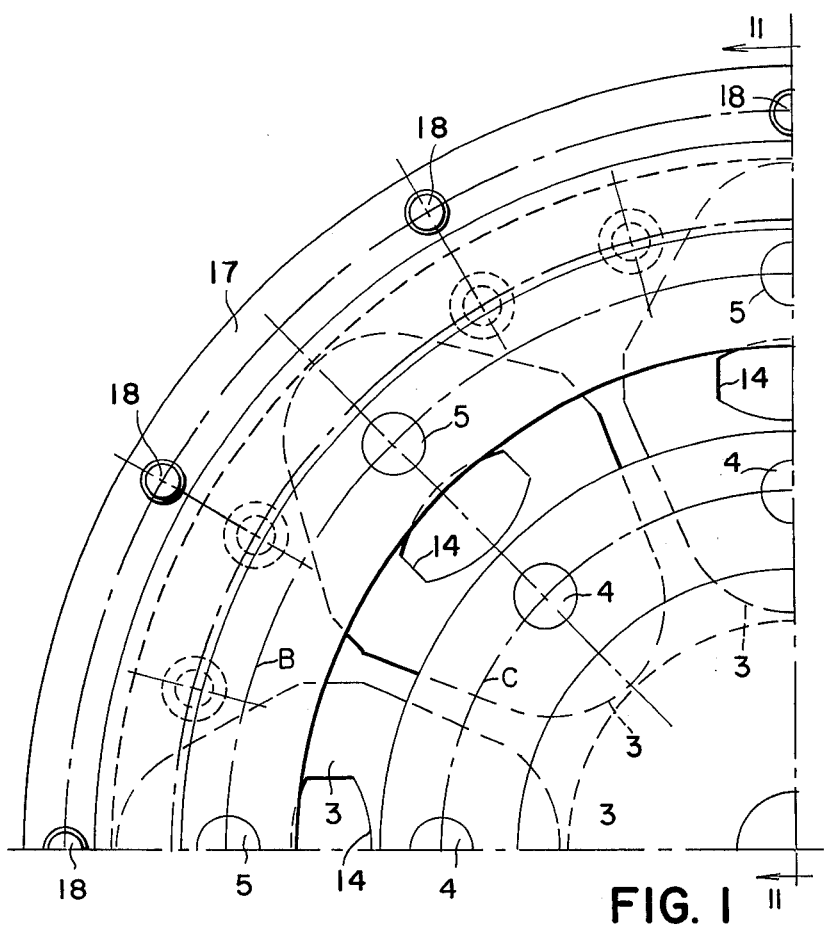
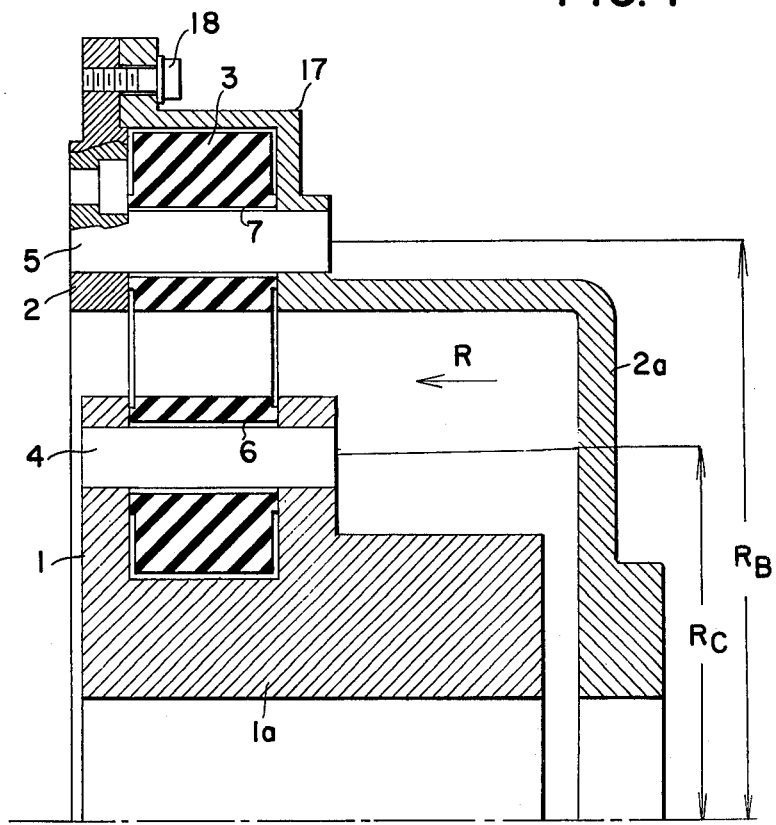
FIG. 1
FIG. 2

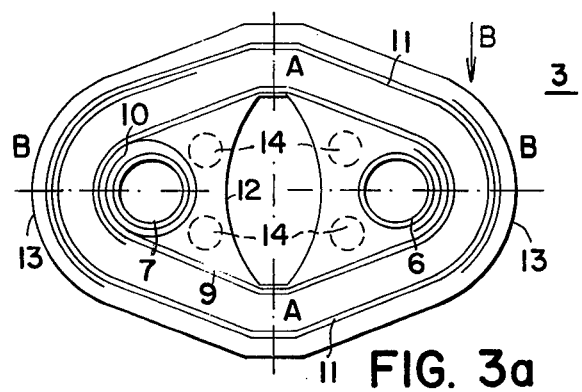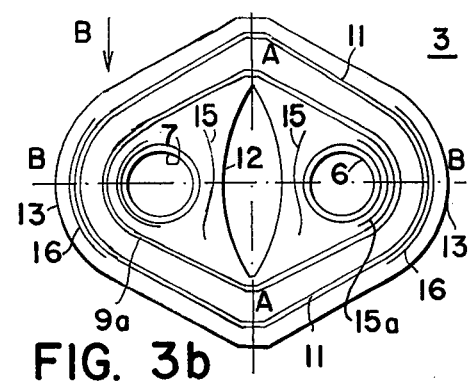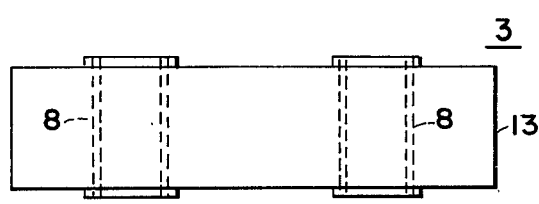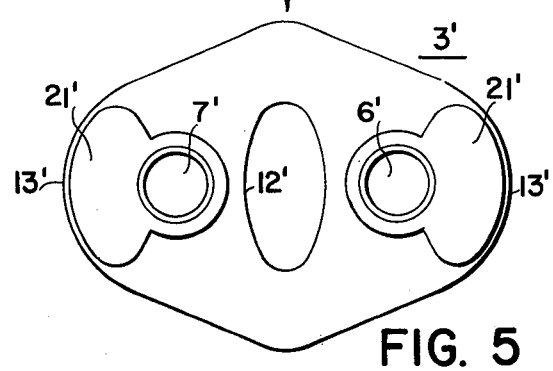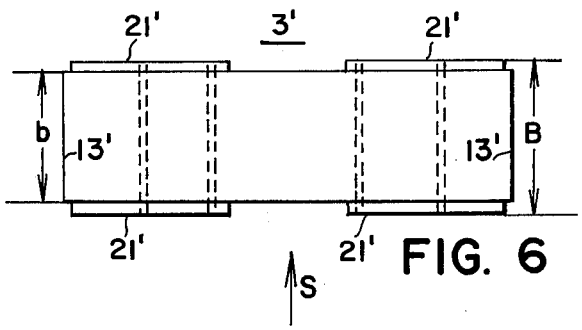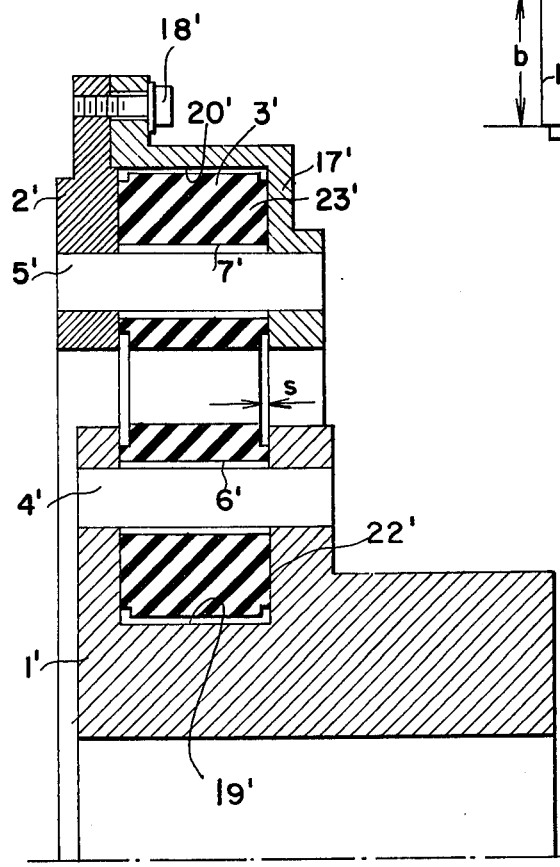

FLEXIBLE COUPLING AND TORQUE-TRANSMITTING MEMBER THEREFOR

BACKGROUND OF THE INVENTION

This invention relates to flexible couplings intended to transmit torque from a first shaft to a coaxial second shaft, or vice versa, from the second shaft to the first shaft. Each flexible coupling includes a first coupling member mounted on a first shaft and having a flange portion, or a flange-like portion, and a second coupling member mounted on a second shaft and having a flange portion, or a flange-like portion, and flexible torque-transmitting means of which one end is tied to the flange portion, or flange-like portion, of the first coupling member, and of which the other end is tied to the flange portion, or flange-like portion, of the second coupling member. Flexible couplings differ from each other mainly by the configuration of the torque-transmitting member, and by the way the latter is affixed to the first and second coupling member.

This invention relates to flexible couplings having a plurality of individual torque-transmitting members which are arranged in a circular pattern around the common axis of the first and the second coupling member, or the common axis of the shafts upon which the coupling members are mounted. These individual torque-transmitting members are of an elastomer, e.g., natural rubber, and each of them is mounted on a pair of studs. The axially outer ends of the radially outer studs of each torque-transmitting member are supported by one of the two coupling members, and the axially outer ends of the radially inner studs of each torque-transmitting member are supported by the other of the two coupling members.

It is the prime object of this invention to provide improved couplings of the aforementioned character.

Another object of this invention is to provide improved torque-transmitting members for transmitting torques from one coupling member, or the flange portion thereof, to another coupling member, or the flange portion thereof.

It is a more specific object of this invention to improve flexible couplings having torque-transmitting members formed by spaced blocks of an elastomer which blocks are surrounded by loops of rope or cord. In such couplings each of the torque-transmitting members may be substantially elliptical, and one of their supporting pins or studs may project through the elliptical torque-transmitting members adjacent one of the ends of the latter, and the other of their supporting pins or studs may project through the elliptical torque-transmitting members adjacent of the other ends thereof. A length of cord may be wound around the elliptical periphery of each of the elastomeric torque-transmitting members.

The specific coupling which has been described above is believed to have the best performance characteristics among the couplings of the kind under consideration. It has, however, a serious limitation which consists in a relatively high degree of wear and tear of the torque-transmitting members.

It is the prime object of the present invention to greatly reduce this amount of wear and tear, and thus to increase the life of the kind of flexible couplings under consideration.

SUMMARY OF THE INVENTION

It has been found that one of the principal reasons accounting for the amount of wear and tear to which flexible couplings of the kind under consideration are subjected lies in almost continuous relative movements between the studs on which the torque-transmitting members are mounted and which carry the latter and the elastomeric bodies by which said members are formed. It is, therefore, one aspect of this invention to limit, or prevent, relative movement between the torque-transmitting members and the studs by which they are supported.

Another reason for the relatively large amount of wear and tear to which flexible couplings of the aforementioned kind are subject resides in the possibility of relative movements between the torque-transmitting members proper and the loops of cord or rope by which each of them is surrounded. It is, therefore, another object of this invention to provide flexible couplings whose torque-transmitting members have reinforcement means which operate in the fashion of the aforementioned loops of rope or cord, but are not subject to displacement relative to the torque-transmitting member proper, i.e., to the elastomeric body thereof.

The torque-transmitting members have stud-receiving passageways for mounting the former by means of studs to the two coupling members of a coupling. Couplings according to this invention include torque-transmitting members of an elastomeric body, e.g., of rubber, having stud-receiving passageways and a reinforcement strip of a woven material inside each of the torque-transmitting members, said strip having one of the ends thereof immediately adjacent one of said pair of stud-receiving passageways and forming a plurality of substantially spirally-shaped windings around said pair of stud-receiving passageways. The strip cannot move relative to the elastomeric torque-transmitting member proper. If the supporting studs are precluded from moving relative the elastomeric torque-transmitting bodies proper, the latter are merely subject to increasing compression as the torque to be transmitted is increased. The stresses in the strips are substantially evenly distributed across their width and among their various windings, or plies, and this is one of the requirements for a long life of the coupling, even under onerous load conditions.

The number of turns of the windings depends upon the requirements which are imposed upon the particular couplings.

It is desirable to line the stud-receiving passageways of the torque-transmitting members with sleeves to prevent damage to the members when the bolts, or studs, by which they are supported, are inserted into them.

When the torque-transmitting members are subjected to compression the constituent elastomeric material thereof is diplaced, or distorted. It is desirable to provide a tertiary passageway between the pair of stud-receiving passageways of the torque-transmitting members as will be shown below in more detail to take care of the necessary deformation of the torque-transmitting members.

The elastomer portion of the torque-transmitting member is preferably not homogenous, but includes areas or zones of increased hardness, as will likewise be shown below in more detail.

BRIEF DESCRIPTION OF THE DRAWINGS

FIG. 1 is a side elevation of a portion — namely a quarter — of a flexible coupling embodying the present invention seen in the direction of the arrow R of FIG. 2;

FIG. 2 is a section of the structure shown in FIG. 1 along II-II of FIG. 1;

FIG. 3a is a side elevation of one of the torque-transmitting members of the structure of FIGS. 1 and 2 seen in the direction of arrow R of FIG. 2;

FIG. 3b is a side elevation of a modification of one of the torque-transmitting members of the structure of FIGS. 1 and 2, seen in the direction of the arrow R of FIG. 2;

FIG. 4 is a top-plan view of the structure shown in either FIG. 3a or FIG. 3b seen in the direction of the arrows B in FIGS. 3a and 3b;

FIG. 5 refers to another embodiment of the invention and shows a torque-transmitting member per se and is a front elevation thereof seen in the direction of the arrow S of FIG. 6;

FIG. 6 shows the same structure as FIG. 5 in top-plan view seen in the direction of the arrow T of FIG. 5; and FIG. 7 is a section similar to that shown in FIG. 2 of a modification of the structure shown in FIG. 2 and particularly intended to be applied in connection with the kind of torque-transmitting members shown in FIGS. 5 and 6.

DESCRIPTION OF PREFERRED EMBODIMENTS

Referring now to the drawings, and more particularly to FIGS. 1, 2, 3a, 3b and 4, thereof, numeral 1 has been applied to indicate the flange of a first coupling member forming a hub 1a for receiving a first shaft (not shown), and reference numeral 2 has been applied to indicate the flange of a second coupling member 2a intended to be mounted on a second shaft (not shown). Flange 1 is intended to transmit torques to flange 2, or vice versa. This is achieved by means of flexible torque-transmitting intermediate members 3 mounted on studs 4 and 5. The axially outer end of studs 4 and 5 are supported by coupling members mounted on separate coaxial shafts (not shown). Studs 4 and 5 are arranged in circular patterns indicated by the dash-and-dot lines B and C, respectively. The radii of circular lines B and C have been indicated in FIG. 2 by the reference characters $r_B$ and $r_C$, respectively. The torque-transmitting members 3 are provided with transverse passageways 6 and 7, respectively, through which the studs 4 and 5 project. Passageways 6 and 7 of the torque-transmitting members 4 are provided with internal linings 8, as clearly shown in FIG. 4. The torque-transmitting members 3 are mounted on studs 4 and 5 in such a fashion as to preclude any pivotal movement of the former around the latter and linings 8 are affixed in passageways 6 and 7 in such a fashion as to preclude such pivotal movement.

As shown in FIG. 1, the torque-transmitting members 3 consist of elongated blocks of an elastomer, e.g., a resilient material such as natural rubber. As shown in FIGS. 3a and 3b the torque-transmitting members 3 are provided with woven reinforcement inserts 9 and 9a. As shown in FIG. 3a the beginning 10 of the reinforcement insert 9 is situated to the left of passageway 7 in member 3 and insert 9 is wound substantially spirally around the two passageways 6 and 7. The distance or spacing between opposite sides of superimposed windings 11 of insert 9 increases in the region of the median plane A—A between passageways 6 and 7. The widening of the distance or spacing between opposite sides of windings 11 is achieved during the manufacturing process of torque-transmitting member 3 by insertion of an appropriate shaped mandrel (not shown) into the workpieces intended to form torque-transmitting members 3. Upon removal of said mandrels cavities 12 are left in members 3 whose shape conforms with that of the cross-sectional area of the mandrel, i.e., its cross-section has about the shape of a radial section through a biconvex lens.

In FIG. 3a reference numeral 13 has been applied to indicate one of the end-surfaces of torque-transmitting member 3, and reference numeral 14 has been applied to indicate regions inside of torque-transmitting member 3 which are situated between passageway 6 and cavity or passageway 12 and between passageway 7 and cavity or passageway 12. End surfaces 13 and regions 14 are made of a harder elastomer than the remaining portions of torque-transmitting members 3, as a result of which the load-carrying capacity of re-inforcement insert 9 and its constituent windings 11 is maximized.

A like effect may be obtained by providing additional re-inforcement inserts 15 and 16 as shown in FIG. 3b. Inserts 15 are arranged between passageways 6, 7 and tertiary passageway 12 and inserts 16 are arranged between end surfaces 13 and windings 11. FIG. 3b shows additional inserts between parts 9a and passageways 6, 7 to which reference character 15a has been applied.

The linings or sleeves 8 inside of passageways 6, 7 ought to be made of a flexible material or a material allowing to be deformed. They may either have a slot extending in a direction longitudinally thereof, or may be made up of two equal, complementary portions or half-shells.

As is apparent from FIGS. 1 and 2 the radially outer portions of torque-transmitting members 3 are enclosed by means of a cover member 17 held in position by means of fasteners or screws 18, arranged along the periphery of a circle.

The torque-transmitting members 3 are pre-stressed when mounted into the coupling. The larger the torque transmitted by members 3, the larger the elastic deformation thereof which is enhanced due to the presence of cavities 12. However, irrespective of the amount of torque transmitted from one coupling member to the other, there in never a relative movement between studs 4, 5 and the torque-transmitting members 3. As a result, the wear of the coupling and more specifically of its torque-transmitting members 3 is minimized. The reinforcement inserts of woven material arranged inside of the torque-transmitting members 3 makes it possible to evenly distribute the stresses to which the latter are subjected. The sleeves or internal linings 8 protect the torque-transmitting members 3 proper when the studs 4, 5 are inserted into the latter. Another function of sleeves or linings 8 is to facilitate insertion of the studs 4, 5 into the passageways 6 and 7. Sleeves or linings 8 may be of an appropriate synthetic resin, or of metal foil.

FIG. 3b shows a torque-transmitting member 3 embodying the invention having a spirally wound reinforcement ply 9a surrounding the stud-receiving passageways 6, 7, and a pair of additional woven reinforcement plies 15a referred-to above. Plies 15a are interposed between stud-receiving passageways 6, 7 and the substantially spirally shaped windings 11 of reinforcement strip 9a.

As mentioned above, the sleeve 8 of non-rigid material shown in FIG. 4 may either have a slit extending in a direction lognitudinally thereof, or it may be formed by a pair of separate complementary parts or half-shells. Either of both modifications is equally acceptable as long as sleeve 8 allows forces prevailing in the elastomeric member 3 to excert a clamping action upon the studs inside of passageways 6, 7.

It will be apparent from FIGS. 3a and 3b that the tertiary passageways 12, i.e., the passageways provided in members 3 in addition to passageways 6 and 7, are arranged symmetrically in regard to the median plane A—A of members 3 situated between the passageways 6, 7 thereof. Passageways 12 are arranged parallel to and between passageways 6, 7 and extend transversely all the way across each of torque-transmitting members 3. As shown in FIGS. 3a and 3b the tertiary passageway 12 is arranged symmetrically in regard to the median plane B—B extending across the pair of stud-receiving passageways 6 and 7.

The configuration of tertiary passageways 12 shown in FIGS. 3a and 3b is a preferred form. Other forms, including a plurality of tertiary passageways might, however, be substituted for that shown in FIG. 12. A pair of tertiary passageways might be substituted for passageway 12 that are cylindrical in shape and parallel to stud-receiving passageways 6, 7 and whose axes are arranged in plane A—A to opposite sides of planes B—B. It will be noted from FIGS. 3a and 3b that the cross-sectional area of tertiary passageway 12 is elongated in a direction transversely to the line interconnecting the centers of the transverse cross-sectional areas of stud-receiving passageways 6, 7. This imparts the desired flexibility to all of the torque-transmitting members 3.

Referring now more specifically to FIG. 2, it will be apparent that in the cross-section of torque-transmitting member 3 all inserts thereof have been deleted in the interest of greater clarity. The inserts 9, 9a, 15, 15a and 16 of part or member 3 have been clearly shown in FIGS. 3a and 3b and described in the context thereof. The specific object of reinforcement insert 15 suggested by the geometrical configuration thereof is to reinforce the elastomeric body 3 in two directions, i.e., in the direction of line B—B and in the direction of line A—A, or at 90° to line B—B.

Referring now to FIGS. 5 and 7, inclusive, the parts shown in these figures which correspond to the parts shown in FIGS. 1–5 have been designated by the same reference characters as the last-mentioned figures with a prime added to them. This has been done in order to avoid unnecessary repetitions.

As shown in FIG. 7, one of two coupling members is provided with a flange 1' and the other coupling member is provided with a flange 2'. Torque-transmitting member 3' is provided with transverse passageways 6', 7' receiving studs 4', 5'. The ends of the latter are supported by the flanges 1', 2'. The radially outer ends of torque-transmitting members 3' are covered by a cover 17' affixed to flange 2' by means of screws, or like fasteners 18'.

The coupling shown in FIGS. 5 to 7 is an improvement over that shown in FIGS. 1–4 inasmuch as the former coupling prevents even more effectively a relative movement between the torque-transmitting members 3' of the coupling and the studs 4', 5' by which they are supported, as a result of which the life of the coupling is further increased, even under the most onerous load or torque-transmitting conditions.

As shown in FIG. 7, the flange 1' of one part of the coupling is provided with a circular groove 19' and flange 2' and cover 17' forming an integral part of the other part of the coupling similarly define a circular groove 20'. The torque-transmitting members 3' extend into the aforementioned grooves 19', 20'.

Reference character s has been applied to indicate a clearance in axial direction left between lateral walls of the torque-transmitting members 3' and the member-receiving grooves 19', 20'. It will be apparent that the side walls 22', 23' of the structure which defines grooves 19', 20' supports the axially outer ends of the studs 4', 5' on which the torque-transmitting members 3' are mounted.

Referring now more particularly to FIGS. 5 and 6 showing a torque-transmitting member intended for the flexible coupling shown in FIG. 7, reference characters 6' and 7' have been applied to indicate the stud-receiving passageways in the elastomeric block 3' and reference character 12' has been applied to indicate the tertiary passageway in elastomeric block 3'. The thickness $b$ of block 3' is equal to the width of the aforementioned grooves 19', 20' shown in FIG. 7. The thickness of blocks or torque-transmitting members 3' is increased in the region immediately adjacent the ends of passageways 6', 7'. Reference character B has been applied to indicate the increased thickness of blocks 3'. Reference character 13' has been applied to indicate the two opposite end surfaces of blocks 3' and it is apparent from FIGS. 5 and 6 that the regions 21' of increased thickness B of blocks 3' extend outwardly close to the end surfaces 13' of blocks 3'.

Referring now again to FIG. 7, it will be apparent that the clearance $s$ between blocks 3' and the coupling structure by which blocks 3' are received is limited to the portions of relatively small thickness $b$ thereof. Blocks 3' are compressed laterally at the regions 21' thereof relatively large thickness B. In other words, blocks or torgue-transmitting members 3' are compressed in the direction of the axis of the flexible coupling.

Under load, i.e., when torques are transmitted from one part of the coupling to the other, torque-transmitting members 3' are pressed against the studs 4', 5'. The pressure exerted against studs 4', 5' is enhanced by the pressure exerted by the portions 22', 23' of the coupling which engage under pressure the regions 21' of increased thickness B, and thus compress the torque-transmitting members 3'. This action is optimized by extending the regions 21' of increased width up to the opposite lateral end surfaces 13' of torque-transmitting members 3'.

Under extremely heavy loads, in particular impact loads, the aforementioned clearance s will be reduced, and may even become zero. This reduction of the clearance s results from increased tension to which the spiral woven cloth reinforcement inserts inside of the torque-transmitting members (See FIGS. 3a and 3b and their context) are subjected. This increased tension results in an axial displacement of some of the elastomeric material of which torque-transmitting members such as shown in FIGS. 3a, 3b, 4, 5 and 6 are made. A reduction or change of the width of clearance s has a damping effect. As long as the variation of the load or torque transmitted are relatively small, the damping effect is due to the deformations to which the material of which members 3' are made are subjected. When the variations of the load or torque transmitted are very large, so that the clearance s becomes virtually zero, members 3' frictionally engage the lateral groove-defining walls 22', 23' of the coupling which results in an additional damping or attenuating action due to friction.

It will be apparent from a consideration of FIGS. 5 and 6 that no internal reinforcement inserts for torque-transmitting members 3' have been shown in these figures. It is intended that the torque-transmitting member 3' shown in FIGS. 5–7 be provided with internal reinforcement inserts such as those shown in FIGS. 3a and 3b.

I claim as my invention:

1. A flexible coupling including a pair of coaxially arranged coupling members, a plurality of torque-transmitting members of a reinforced elastomer arranged in a circular pattern around the common axis of said pair of coupling members, each of said plurality of torque-transmitting members defining a pair of parallel stud-receiving passageways, a plurality of pairs of studs, each pair of said plurality of pairs of studs projecting through a pair of said stud-receiving passageways of one of said plurality of torque-transmitting members, one of each of said plurality of pairs of studs being supported by one of said pair of coupling members and the other of each of said plurality of pairs of studs being supported by the other of said pair of coupling members, and a woven reinforcement strip substantially spirally wound around said stud-receiving passageway wherein the improvement comprises in that said torque-transmitting members (3) are pre-stressed under compression, so as to preclude any relative movement between each of said plurality of pairs of studs (4,5, 4', 5') and one of said plurality of torque-transmitting members (3', 3') mounted thereon.

2. A flexible coupling as specified in claim 1 wherein said pair of stud-receiving passageways (6, 7) of each of said plurality of torque-transmitting members (3) in lined with a sleeve (8) of a non-rigid material in such a fashion as to preclude any pivotal movement of said studs (4, 5) in said passageways (6, 7).

3. A flexible coupling as specified in claim 2 wherein said sleeve has a slit extending to a direction longitudinally thereof.

4. A flexible coupling as specified in claim 2 wherein said sleeve is formed by a pair of separate complementary parts.

5. A coupling as specified in claim 1 wherein a tertiary passageway means (12, 12') is arranged between and parallel to said pair of stud-receiving passageways (6, 7; 6', 7') in each of said plurality of torque-transmitting members (3, 3'), said tertiary passageway means extending transversely all the way across each of said plurality of torque-transmitting members.

6. A coupling as specified in claim 5 wherein said tertiary passageway means (12, 12') is arranged symmetrically in regard to the median plane (A—A) situated between said pair of stud-receiving passageways (6, 7; 6', 7') of each of said plurality of torque-transmitting members (3, 3').

7. A coupling as specified in claim 6 wherein said tertiary passageway means (12, 12') is arranged symmetrically in regard to the median plane (B—B) extending across said pair of stud-receiving passageways (6, 7; 6'7') of each of said plurality of torque-transmitting members (3, 3').

8. A coupling as specified in claim 7 wherein the transverse cross-sectional area of said tertiary passageway means (12, 12') of each of said plurality of torque-transmitting member (3,3') is elongated in a direction transversely to the line (B—B) interconnecting the centers of the transverse cross-sectional area of said pair of stud-receiving passageways (6, 7; 6', 7') thereof.

9. A coupling as specified in claim 8 wherein said transverse cross-sectional area of said tertiary passageway means (12, 12') is substantially in the shape of a section through a biconvex lens.

10. A coupling as specified in claim 7 wherein said tertiary passageway means (12, 12') is formed by a plurality of separate passageways.

11. A coupling as specified in claim 7 wherein each of said plurality of torque-transmitting members (3') has such a shape that the length (b) of said tertiary passageway means (12') in the direction of the axis thereof is less than the length (B) of said stud-receiving passageways (6', 7') in the direction of the axis thereof.

12. A coupling as specified in claim 5 wherein each of said plurality of torque-transmitting members (3) is provided with regions of relatively increased hardness (14) positioned between said stud-receiving passageways (6, 7) and said tertiary passageway (12).

13. A coupling as specified in claim 5 wherein each of said plurality of torque-transmitting members (3) is provided with a reinforcement insert (15) positioned between said pair of stud-receiving passageways (6, 7) and said tertiary passageway means (12).

14. A coupling as specified in claim 1 wherein
 a. said pair of coupling members define circular grooves receiving said plurality of torque-transmitting members (3'), and wherein
 b. each of said plurality of torque-transmitting members (3') has regions of relatively small thickness and regions (21') of relatively large thickness, said regions of relatively large thickness being situated immediately adjacent to the ends of said pair of stud-receiving passageways (6', 7').

15. A coupling as specified in claim 14 wherein said regions (21') of relatively large thickness extend from the ends of said stud-receiving passageways (6', 7') to points immediately adjacent the lateral end surfaces (13') of said torque-transmitting members (3').

16. A coupling as specified in claim 14 wherein said grooves have a predetermined width in excess of the thickness (b) of said regions of relatively small thickness of said plurality of torque-transmitting members (3') so as to normally leave a clearance (s) between the lateral walls that define said grooves and said regions of relatively small thickness of said plurality of torque-transmitting members (3').

17. A flexible coupling including a pair of coaxially arranged coupling members, a plurality of torque-transmitting members of an elastomer arranged in a circular pattern around the common axis of said pair of coupling members, each of said plurality of torque-transmitting members defining a pair of parallel stud-receiving passageway, a plurality of pairs of studs, each pair of said plurality of pairs of studs projecting through a pair of stud-receiving passageways in one of said plurality of torque-transmitting members, one of each of said plurality of pairs of studs being supported by one of said pair of coupling members and the other of each of said plurality of pairs of studs being supported by the other of said pair of coupling members, wherein the improvement comprises (1) in that a woven reinforcement strip is arranged inside of each of said plurality of torque-transmitting members (3, 3'), which strip extends spirally around both stud-receiving passageways (6, 7; 6', 7') thereof and wherein the improvement further comprises (2) in that tertiary passageway means (12, 12') are defined by each of said plurality of torque- transmitting members, said tertiary passageway means extending parallel to said pair of stud-receiving passagewys and being arranged symmetrically in regard to the median plane (A—A) between said pair of stud-receiving passageways.

18. A torque-transmitting member for flexible couplings for interconnecting the drive part of the coupling and the driven part thereof, said member including
   a. an elongate member (3, 3') of an elastomeric substance defining a pair of parallel passageways (6, 7; 6', 7') arranged adjacent the ends of said member symmetrically in relation to a median plane (A—A)of said member, said pair of passageways having ends situated in opposite surfaces of said member;
   b. a reinforcement insert (9, 9a) of woven cloth inside said member, said insert being in the form of a strip having one end (10) immediately adjacent to one of said pair of passageways and forming at least one winding (11) surrounding said pair of passageways; and
   c. said member further defining a tertiary passageway (12, 12') arranged midway between said pair of passageways (6,7; 6', 7') symmetrically in relation to said median plane of said member and having open ends situated in oppostie surfaces of said member.

19. A torque-transmitting member as specified in claim 18 wherein said strip (9, 9a) forms a plurality of superimposed helical windings (11) surrounding said pair of passageways (6, 7; 6', 7').

20. A torque-transmitting members as specified in claim 18 wherein the thickness (B) of said member (3') adjacent said ends of said pair of passageways (6', 7') exceeds the thickness (b) of said member at other regions of opposite surfaces thereof.

21. A torque-transmitting member as specified in claim 18 wherein said member (3) is provided with a first pair of reinforcement inserts (15a) each surrounding one of said pair of passageways (6, 7) and each interposed between one of said pair of passageways and said winding (11) surrounding said pair of passageways, and wherein said member is further provided with a second pair of reinforcement inserts (16) each interposed between said winding surrounding said pair of passageways and the outer lateral surface of said member.

22. A torque-transmitting member as specified in claim 18 wherein said member is provided with reinforcement inserts (15) positioned between said pair of passageways (6, 7) and said tertiary passageway (12).

* * * * *